Dec. 26, 1950 H. F. LOEWER ET AL 2,535,433
LAST BLOCK CENTERING APPARATUS
Filed Dec. 20, 1946 6 Sheets-Sheet 1

Inventors
Henry F. Loewer
Oscar S. Porter
By their Attorney

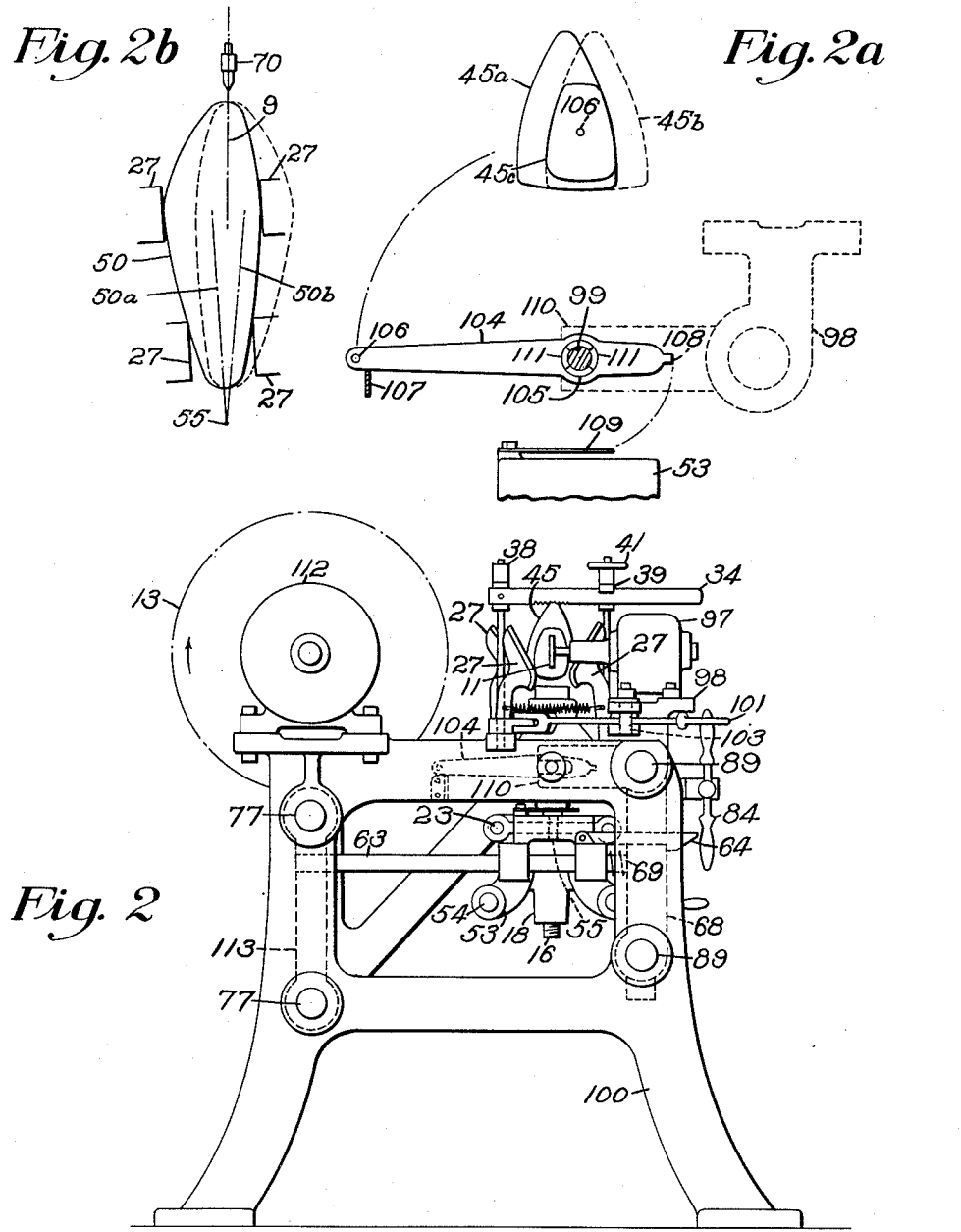

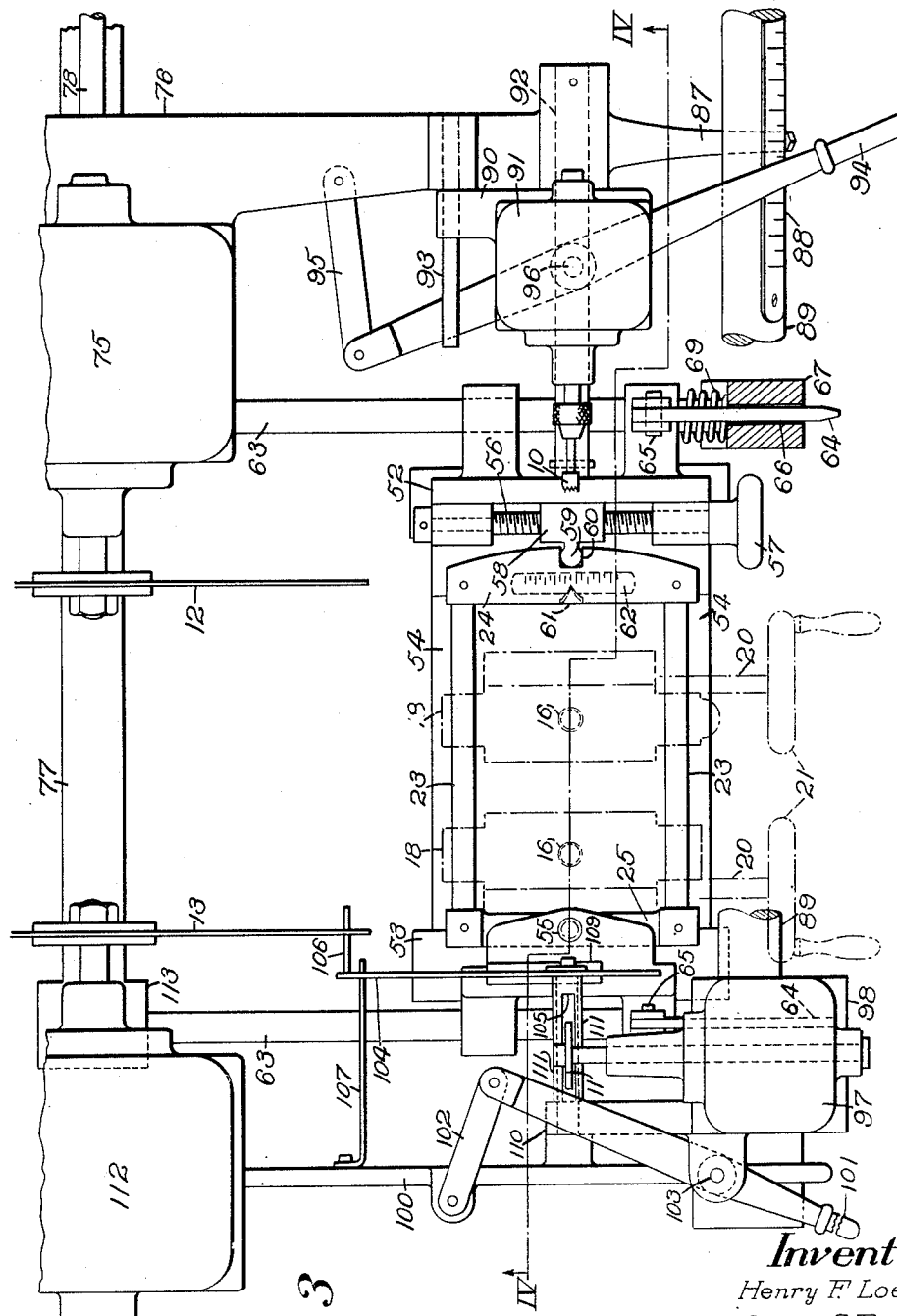

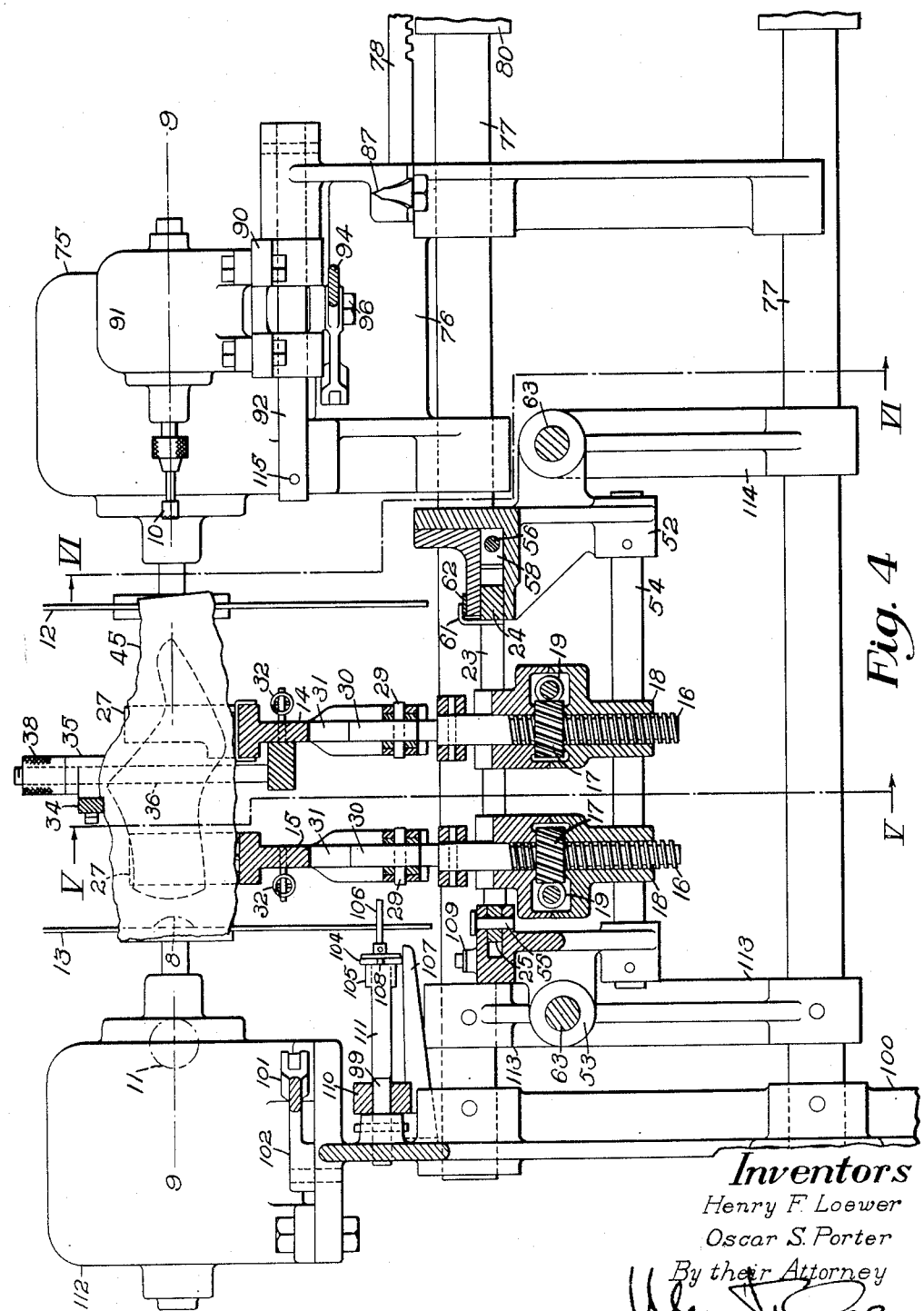

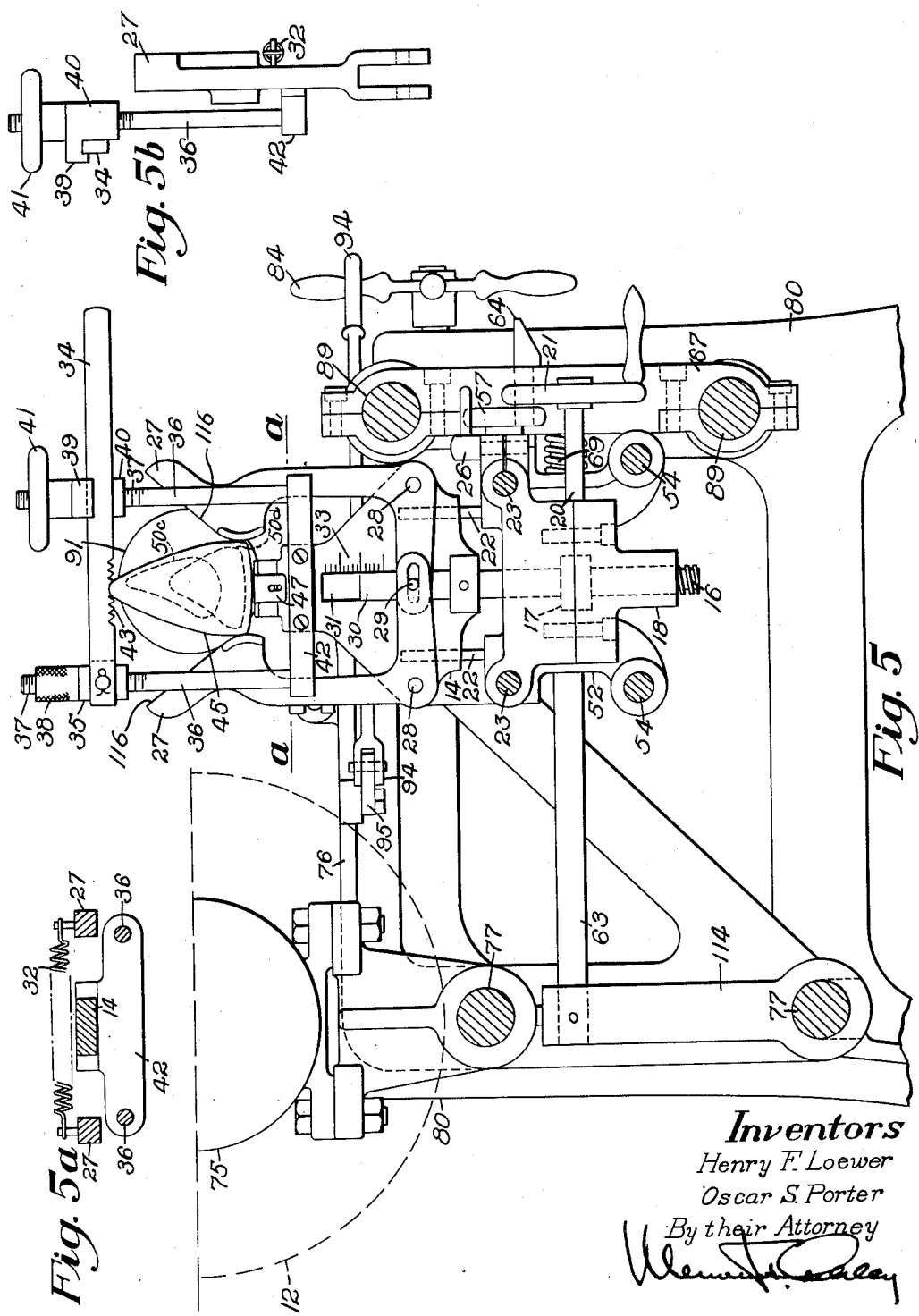

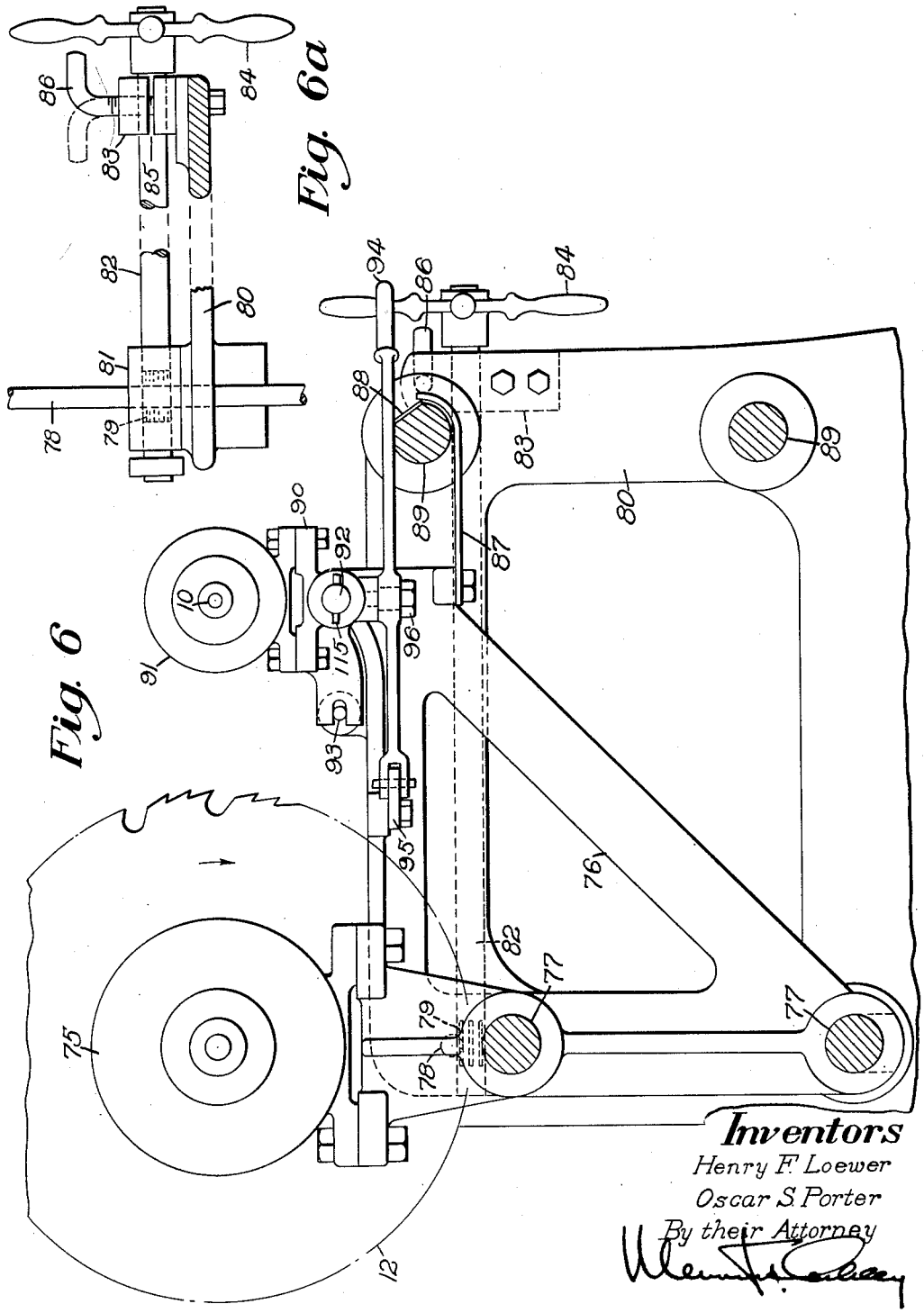

Patented Dec. 26, 1950

2,535,433

UNITED STATES PATENT OFFICE 2,535,433

LAST BLOCK CENTERING APPARATUS

Henry F. Loewer, Rochester, N. Y., and Oscar S. Porter, Shrewsbury, Mass., assignors to United Last Company, Portland, Maine, a corporation of Maine Application December 20, 1946, Serial No. 717,428

8 Claims. (Cl. 144—1)

One purpose of the present invention is to provide an apparatus adapted to prepare the ends of a rough last-block for engagement with the dogs of a copying lathe. Such preparation includes spotting the toe end of a block with a drill of a type corresponding to the toe dog of the lathe, and spotting the heel end of the block with a tool of a type corresponding to the heel dog (a driving dog) of the lathe. The preparation may also include cutting off the ends of the block if the latter has more than the desired amount of surplus length for stub allowances.

Another purpose is to provide an apparatus in which the user may ascertain, prior to spotting the ends of any selected block, whether that block is large enough to yield a complete last of predetermined dimensions, and in which he may also locate a block relatively to the spotting tools with a degree of accuracy that will insure production of a complete last even though the margin of surplus wood in the block may be no more than ⅛ inch at the points of least surplus allowance. One advantage in using a block with no more than enough surplus stock is economy in material. Another advantage, derived from practicing such economy, lies in minimizing the cutting burden on the lathe.

To insure complete lasts when minimum allowances of surplus stock are provided requires more nearly accurate spotting than an operator can furnish with any certainty when the selection and setting of blocks are dependent upon guesswork. This is especially so in the case of blocks selected for furnishing crooked lasts and those selected for high-cone lasts. Therefore, even though a block may be large enough, close limits of surplus stock in the mid-portion thereof impose correspondingly close limits of heightwise and widthwise setting of the ends of the block with respect to the dogs by which the block is to be held in a lathe. Correctly locating the spots for the lathe-dogs constitutes one of the problems with which the invention is concerned.

To this end the invention provides an apparatus having adjustable block-holding means in which a selected last-model, if placed therein prior to placing a block, will indicate how said means must be adjusted with respect to the tools with which the ends of a block are to be spotted for the reception of lathe-dogs. One scale with which the block-holding means is provided will indicate the width of the last-model in its ball region, and will thereafter indicate the corresponding dimension of any selected last-block that replaces it. Furthermore, after the block-holding means have been adjusted according to the size and style characteristics of a model, and after the model has been replaced by a block, the block-holding means will not only accommodate the larger dimensions of the block but will also give it a position corresponding to the adjustments derived from the model. Provision is also made for indicating whether the cone portion of the block is higher than that of the model to insure a turning allowance.

The invention also provides relatively adjustable power-driven saws by which the ends of a block may be cut off in planes at right-angles to the turning axis of a block after that axis has been established and while the block is clamped in the block-holding means, but before its ends have been spotted. The apparatus is provided with a scale for indicating adjustments of one of the saws according to the length a block will have after both of its ends have been cut off.

The invention includes means for adjusting the block-holding means angularly about a heightwise axis in accordance with swing of a crooked model. This adjusting means is supplemented by an individual scale having a median or zero mark corresponding to the setting that would be required by a straight model. The readings of this scale may be used to indicate settings for mated crooked lasts both derived from one crooked model.

Referring to the drawings,

Fig. 2 is an elevation of the left end of the apparatus;

Fig. 2a is a left end elevation of a last-block and a device for centering the heel end of a model, the slide for carrying a heel-end spotting tool being represented in dotted lines;

Fig. 2b is a diagram representing the plan outline of a crooked left last in solid line, and the corresponding outline of a crooked right last in dotted line;

Fig. 3 is a top plan view of the apparatus partly broken away and partly in section, some of the elements of the block-holding means being omitted to uncover other elements;

Fig. 4 is a vertical section indicated by line IV—IV in Fig. 3;

Fig. 5 is a vertical section indicated by line V—V in Fig. 4;

Fig. 5a is a section indicated by line a—a in Fig. 5;

Fig. 5b is a front elevation of some of the elements in Fig. 5 and is projected therefrom;

Fig. 6 is a sectional elevation indicated by line VI—VI in Fig. 4;

Fig. 6a is a sectional plan view, partly broken away, of an adjusting mechanism included in Fig. 6;

Figure 1:
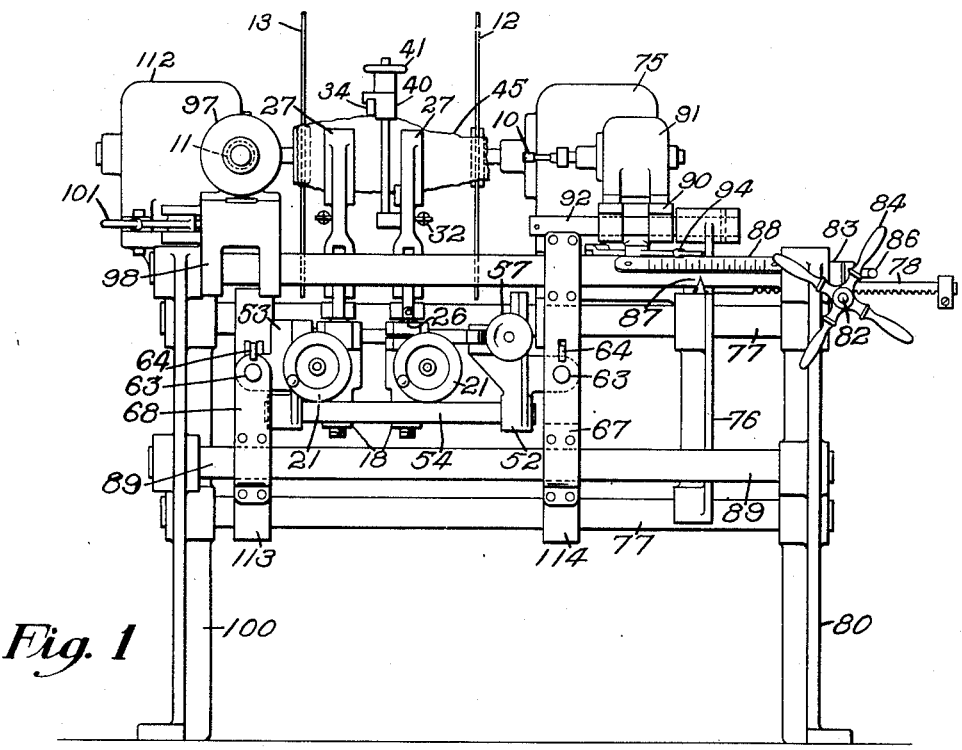
Fig. 1 is a front elevation of an appartus organized in accordance with the invention.

The tool equipment of the apparatus includes (Fig. 7) a rotary tool 10 for spotting the toe end of a last-block 45, a rotary tool 11 for spotting the heel end thereof, a circular disk-saw 12 (Fig. 6) for cutting off the toe end, if need be, of the block, and a saw 13 of the same type for cutting off the heel end of the block.

The axis 9 (Fig. 4) of the tool 10 is fixed, but the tool is movable along its axis and may be shifted manually toward and from its operating position. The tool 11 lies on the axis of the tool 10 and may be shifted manually toward and from the latter, but, since the tool 11 is intended to cut a flat heightwise kerf in the heel end of a block, its axis intersects that of the tool 10 and is perpendicular thereto. The choice in the types of the spotting tools is governed according to the types of dogs on which a block will be subsequently mounted in a copying lathe.

The saws 12 and 13 lie on a fixed axis of rotation at the rear of the apparatus and parallel with the axis of the tool 10. The planes of the saws are therefore perpendicular to the axis of the tool 10. The location of the saw 13 is fixed, but the saw 12 may be shifted along its axis to any desired location, according to the length a block is to have after its ends have been sawed.

The spotting tools are located near the front of the apparatus, preferably in the horizontal plane of the axis of the saws. The procedure to be followed in preparing a block is to fasten the latter in block-holding means (to be described) initially held at a spotting station; next, to feed the block to the saws 12 and 13, if need be, by moving the block-holding means toward the rear of the apparatus; next, to return the block-holding means to the spotting station; and, finally, to feed the spotting tools into the trimmed ends of the block. The block-holding means are located between the planes of the saws 12 and 13 to clear the latter while the saws are sawing the projecting ends of a block. Furthermore, the block-holding means are adjustable heightwise, widthwise of the apparatus, widthwise of a block, and angularly about a heightwise axis that lies always in the plane of the heel end saw 13 and that intersects the axis of the spotting tool 10 only when the block-holding means are at the spotting station.

Two jacks 14 and 15 (Fig. 4) are included in the block-holding means, one for supporting the forepart of a block, and the other for supporting the heel part thereof. They are adjustable heightwise to regulate the pitch and height of a block, each jack having a screw-threaded stem 16 and an adjusting nut 17 provided with gear-teeth on its periphery. The stems are adapted to slide up and down in individual bearing members 18 each provided with a worm 19 engaging the gear-teeth of the corresponding nut 17. Each worm is formed on a shaft 20 (Fig. 5) and each shaft is provided with a hand-wheel 21. The jacks are bored to receive vertical pins 22 affixed to the members 18 and are thereby prevented from turning, the pins having the same effect as splines.

The two bearing members 18, 18 are each mounted and adapted to slide on two parallel rods 23 of a holder which also comprises flat bars 24 and 25 rigidly connecting the ends of the rods. These rods and bars form a substantially flat open frame for supporting the jacks and maintaining them in various cooperative relations. The bearing member 18 of the forepart jack (Fig. 5) has one split clamping boss through which the front rod 23 extends, and that boss is provided with a clamping screw 26 by which the bearing member may be fastened at any desired position along the length of the rods, according to the heel-to-ball length of a model.

Each jack is provided with a pair of jaws 27 arranged to clamp a model or a block widthwise near its bottom. The jaws are in the form of bell-cranks and are connected to the body of the jack by pivot pins 28. Their horizontal arms are lapped and provided with slots through which a pin 29 extends. The pin is affixed to a vertically movable block 30 located in a slot 31 in the body of the jack, and is midway between the pivot pins 28. Its effect is to equalize the movements of the jaws toward and from each other and thereby locate the contacting surfaces of a block equally distant from the median vertical plane of the jack assemblage. The jaws are normally biased toward each other by a tension spring 32, and the block 30 is thereby normally biased downwardly. The upper end of the block is cooperatively related to a scale 33 consisting of a series of lines on the body of the jack, and serves to indicate the width of the jaw-engaging portion of a model or a block, as the case may be.

To facilitate separating the jaws their upper portions are provided with oppositely inclined surfaces 116 (Fig. 5) that converge downwardly. When a model or a last-block is depressed in the V-shaped crotches formed by the surfaces 116 it deflects each jaw away from its mate in opposition to the tension of the springs 32.

Still referring to Fig. 5, the forepart jack is provided with means for measuring the height of a model 50, thereafter, the height of a block 45, and finally for exerting downward pressure on the top of a block to clamp it heightwise. The rear end of a clamping bar 34 is pivotally connected to a sleeve 35 adapted to slide along a vertical rod 36. The bore of the sleeve is smooth, but the rod has a screw-thread 37 with which a finger-nut 38 cooperates. When the bar 34 extends across the cone portion of a block 45 its upper edge may be caught by a notched lug 39 formed on another sleeve 40 which also has a smooth bore and is adapted to slide along another vertical rod 36 having a screw-thread 37. This sleeve may be driven down by a hand-nut 41 to clamp the block. The two rods 36 are affixed to a bar 42, and the latter is affixed to the body of the forepart jack 14.

When the nut 41 is unscrewed from the sleeve 40 the latter may be raised to release the bar 34, and the bar may be swung to the rear. To measure the height of a model standing on the jacks the operator may place the bar 34 on the highest point of the model without connecting the bar and the sleeve 40, and adjust the nut 38 to level the bar. Thereafter, when the model is replaced by a block 45 and the bar 34 placed on the latter, the block must be high enough to support the free end of the bar at a level considerably above that of the pivoted end thereof to indicate enough surplus stock for turning. One edge of the bar is preferably provided with sharp teeth or spurs 43 so located as to indent the top of a block in consequence of depressing the bar. These spurs need not engage the model, since the pivotal connection between the bar and the sleeve 35 and the freedom of this sleeve to turn about its rod 36 provide for inverting the bar to place the spurs uppermost when measuring the model. When these spurs are at the bottom of the bar and driven into the cone portion of a block they brace the latter against rocking sidewise.

The clamping bar 34 is located at the left of the forepart jaws 27, as viewed from the front (see Fig. 4), and its point or points of engagement with a block 45 are therefore between the perpendiculars of the two jacks. Consequently, the one bar 34 suffices to maintain pressure of the bottom of a block against both jacks.

Figure 7:
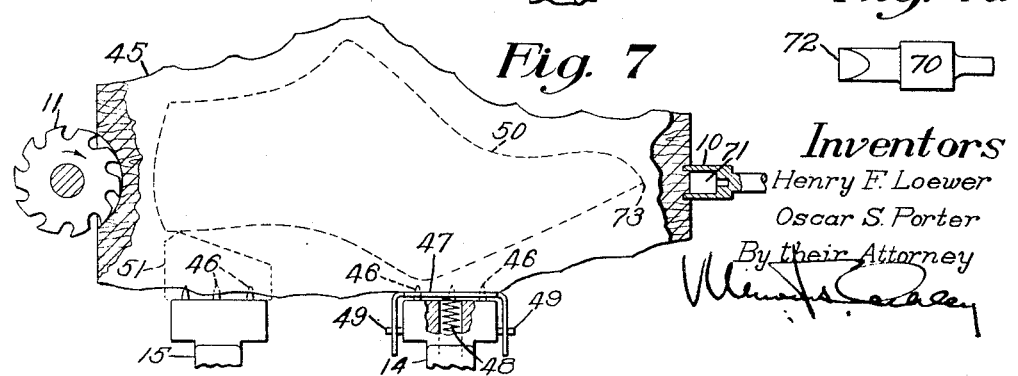
Fig. 7 (sheet 1) is a front elevation, partly in section, including a last-block, two spotting tools engaging its ends, and two jacks for supporting it.

As shown in Fig. 7, the jacks are provided with sharp, pointed spurs 46 arranged to indent the bottom of a block when the latter is depressed either by a blow or by tightening the clamping nut 41. The jack 14 is provided with a sheet-metal guard 47 having holes occupied by the spurs 46. The guard is normally raised to the level of the tops of the spurs by a compression spring 48, and its purpose is to support the forepart of a model last 50 (dotted lines) out of contact with the spurs. The ends of the guard are bent down and provided with vertical slots to receive pins 49 affixed to the jack. When a block 45 is pressed down on the guard the latter will yield to enable the spurs to penetrate the block.

The heel part jack 15 need not be provided with a yieldable guard if a detachable filler 51 (dotted lines) is used to support the heel part of a model but removed from the jack when a block 45 is set up instead of a model. A plurality of fillers 51 of different heightwise dimensions may be used interchangeably, and selected according to the "heel heights" of models 50 of various bottom profiles. The fillers may be provided with sockets to receive the spurs 46 of the heel part jack.

The jack-supporting frame 23, 23, 24, 25 is mounted in a feed-carriage of skeleton construction comprising spaced slides 52 and 53 rigidly connected by two rods 54. This frame and the slide 53 are connected by a vertical pivot pin 55 (Fig. 4) about which the frame may be adjusted angularly to counteract the forepart swing of crooked lasts which is due to offsetting the toe of a left last to the right, and the toe of a right last to the left, of a longitudinal median line through the heel and ball portions (see Fig. 2b). When the block-holding means are located at the spotting station the axis of the pivot 55 intersects the axis 9 of the tool 10 and is normal to the axis 9. The point of intersection is contiguous to, if not within, the field of operation of the tool 11, but its location is not critical, provided it is so near the point where the back of a model is to be registered that little, if any, lateral displacement of the back will be caused by adjusting the jack-supporting frame.

Fig. 3 illustrates means for adjusting the frame 23, 23, 24, 25. A screw 56, provided with a handwheel 57, is journaled in the slide 52 and extends through a traveling nut 58 of rectangular cross-section which is prevented from rotating by parallel confronting faces of the slide. A cylindrical lug 59 formed on the nut engages confronting faces of a recess 60 formed in the bar 24, and its effect is to shift the bar toward the front or rear of the apparatus. A pointer 61 affixed to the bar 24 cooperates with a scale 62 (Fig. 4) affixed to the slide 52 to indicate the median or zero position of the jack-supporting frame and other positions angularly related thereto.

The slides 52 and 53 of the feed-carriage are supported by two fixed parallel rods 63 arranged to guide the carriage in a straight, horizontal path parallel with the planes of the saws 12 and 13. After a block 45 has been set up and clamped in the block-holding means at the spotting station, with its ends projecting across the planes of the saws, the feed-carriage may be pushed manually toward the saws far enough to enable them to cut off the ends of the block. Thereafter, when the feed-carriage is drawn forward as far as it may be, it will be automatically latched at the spotting station by means about to be described.

Gravity latches 64 (Figs. 1, 2, 3 and 5) are carried by the slides 52 and 53, respectively, and are connected to them by horizontal pivot pins 65. The latching shoulder of the right-hand latch (Figs. 3 and 5) is adapted to travel through a hole 66 in an upright bar 67 of the main frame in which the front end of the corresponding guide rod 63 is affixed. The front end of the left-hand rod 63 (Fig. 1) is affixed in a relatively short supporting bar 68 the upper end of which is located where the latching shoulder of the corresponding latch 64 may engage it. Each guide rod 63 is surrounded by a short helical spring 69 arranged to cushion the impact of the feed-carriage against the bars 67 and 68 and to react, when compressed, to counteract over-travel of the carriage and thereby draw the latching shoulders of the latches against the front faces of the bars. When the feed-carriage is registered by cooperation of the springs and the latches, the axis of the vertical pivot pin 55 (Figs. 3 and 4) will intersect the axis 9 of the tool 10. Since the axis of angular adjustment of the frame 23, 23, 24, 25 is thus located in the plane of the heel end saw 13 and in the operating field of the spotting tool 11, the heel end of a block 45 will be spotted midway between its sides in every setting of that frame, regardless of whether the middle of the toe end is in line with the spotting tools or displaced to one side for a crooked left last or to the opposite side for a crooked right last. The pointer 61 and scale 62 enable the operator to obtain the same degree of a reversed angular setting of the jack-supporting frame as that of a primary angular setting obtained directly from a crooked model.

Figure 7A:
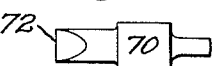
Fig. 7a is an elevation on a larger scale of a detachable centering pin adapted to be inserted into the spotting tool at the right of Fig. 7.

For centering procedure, a detachable centering pin 70 (Fig. 7a) may be inserted into the mouth 71 of the tool 10. The scale of Fig. 7a is twice that of Fig. 7, but when this difference in scales is taken into account it may be realized that the large cylindrical body of the pin 70 will fit inside the cylindrical mouth 71 while the left-hand end of the pin projects therefrom. This end is beveled at opposite sides to provide a thin straight edge 72 that intersects the axis of the pin. When the pin is assembled with the tool 10 the edge 72 may be horizontal or vertical. If horizontal, it will indicate the level at which the edge 73 of a model 50 should be supported by the jacks, but if vertical it will indicate the vertical plane in which the center of the toe end of the model should be located as by turning the hand-wheel 57 (Fig. 3).

The spotting end of the tool 10 is annular and is provided with teeth for cutting a circular groove adapted to receive the type of toe-dog with which many, if not all, last-lathes are equipped. This type of tool is commonly termed a "drill" in last-making parlance. The apparatus includes means, hereinafter described, by which the tool 10 may be moved along its axis, first to place the pin 70 in a favorable location for registering the toe end of a model, and thereafter to drive the tool (without the pin 70) into a block 45.

The saw 12 is carried by the shaft of an electric motor 75, and the latter is affixed to a carriage 76 (Figs. 1, 4, 5 and 6) so mounted as to be adjustable along lines perpendicular to the planes of the saws. The saw-carriage is supported and guided by two parallel horizontal rods 77, one above the other, at the rear of the apparatus. Fig. 1a includes a portion of the carriage 76 without the motor 75, also a rack 78 and a pinion 79 for adjusting the carriage. The rack extends through a hole in a member 80 of the main frame, and through a hole in a bearing member 81 affixed to the member 80. The teeth of the pinion 79 are formed on a shaft 82 (Figs. 1 and 6) journaled in the bearing member 81 and in another bearing member 83 affixed to the front portion of the frame member 80. The front end of this shaft is provided with a hand-wheel 84. To prevent accidental movement of the carriage 76, the bearing in the member 83 for the shaft is bored slightly undersize and provided with a radial kerf 85 that permits it to be expanded by a screw 86 that engages a thread in the outer division of the member and abuts the inner division thereof. When the screw is relaxed this bearing member grips the shaft with the effect of a band-brake.

A pointer 87 (Figs. 1, 3, 4 and 6) affixed to the carriage 76 is arranged to cooperate with a scale comprising a series of marks on a strip 88 to indicate the stations at which the saw 12 may be located by turning the hand-wheel 84. The strip 88 is affixed to the upper one of two rods 89 both located at the front and both parallel with the rods 77 at the rear of the frame.

The saw-carriage 76 also carries a tool-slide 90 (Figs. 1, 3, 4 and 6) that is movable relatively thereto for the purpose of carrying the tool 10 to and from the work while the carriage itself remains stationary. Since the tool-slide is superposed on the saw-carriage its limits of individual travel partake of every adjustment of the carriage. An electric motor 91 is affixed to the tool-slide, and the tool 10 is affixed to the shaft of the motor. Two rods 92, 93 affixed to the carriage 76 support the tool-slide, maintain the tool on a fixed axis of rotation, and guide the tool along a straight path perpendicular to the planes of the saws 12, 13. A lever 94 is provided for moving the tool-slide along the rods 92, 93. The rear end of this lever is connected to the carriage 76 by a pivoted link 95 which constitutes a floating fulcrum. An intermediate portion of the lever is connected to the tool-slide by a pivot stud 96.

Figure 1A:
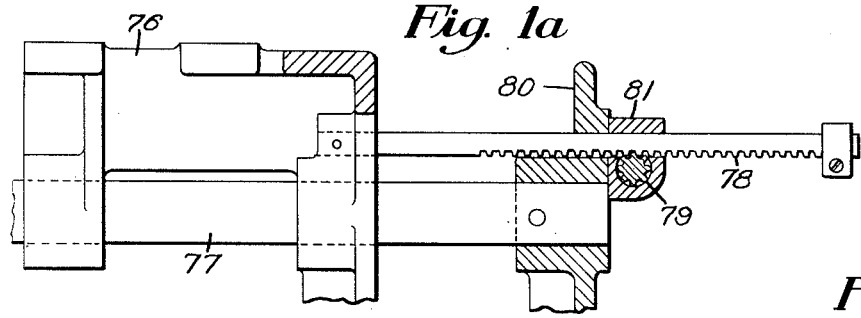
Fig. 1a is a front elevation, partly in section and on a larger scale, of means for adjusting the saw-carriage near the right end of the apparatus.

The tool 11, for spotting the heel end of a block, is affixed to the shaft of an electric motor 97 (Figs. 1, 2 and 3). This motor is affixed to a tool-slide 98, and the latter is supported and guided by the upper rod 89 and a short supplemental rod 99. Both of these rods are affixed to a member 100 of the main frame, and they are arranged to guide the slide 98 along a straight path parallel with that of the other tool-slide 90. A lever 101 is provided for shifting the slide 98 toward and from the slide 90. The rear end of this lever is connected to the frame member 100 by a pivoted link 102 that constitutes a floating fulcrum, while an intermediate portion of the lever is connected to the slide 98 by a pivot pin 103.

An arm 104 (Figs. 2a, 3 and 4) is provided with a pin 106 for indicating the desired setting of the back of the heel of a model 59 and the point thereon intersected by the axis 9 of the tool 10. The arm 104 is affixed to a sleeve or hub 105, and the latter is mounted on the guide rod 99 and is adapted to turn thereon. When the pin 106 is not in use a portion of the arm 104 may lie on a stop 107 affixed to the frame member 100, but when the arm is erected a finger 108 formed thereon is caught by a latch 109, and the pin 106 is thereby held in alinement with the tool 10. The latch 109 is a leaf-spring anchored to the top of the carriage member 53, and is provided with a hole adapted to receive the finger 108.

Two diametrically opposite segments of the sleeve or hub 105 are cut away to enable a forked arm 110 of the tool-slide 98 to traverse the rod 99 when, but only when, the arm 104 lies on the stop 107. The remaining segments 111 of the sleeve 105 are no wider than the diameter of the rod 99 and will clear the arm 110 when the arm 104 is seated on the stop 107, but when the arm 104 is erected the segments 111 will lie in the path of the arm 110 to prevent advancing the tool-slide. This feature also requires the tool-slide to be retracted nearly, if not quite, to its left-hand limit of travel before the arm 104 can be erected. The free end of the pin 106 may serve as an abutment for locating the heel ends of all models at a uniform distance from the plane of the saw 13 to provide stub allowances in blocks 45. Furthermore, if the pin 106 is provided with a line of demarcation in the plane of the saw 13, as by painting a portion of its length with a paint of contrasting color, such a line will indicate how far to the left the heel end of a block 45 should be set to insure the desired length of stub allowance, with or without a slight additional factor to be cut off by the saw.

The saw 13 is affixed to the shaft of an electric motor 112, and this motor is affixed to the frame member 100. The two principal uprights or end pieces 80 and 100 of the frame structure are rigidly connected by each of the four parallel rods 77, 77, 89, 89. The two front rods 89, 89 provide support for the long upright bar 67 (Fig. 1), the lower rod 89 provides support for the short upright bar 68, the two rear rods 77 provide support for a long upright bar 113 (Fig. 2) in which the rear end of the left-hand rod 63 is affixed, and the lower rod 77 provides support for a short upright bar 114 (Fig. 5) in which the rear end of the right-hand rod 63 is affixed. The short bar 114 provides clearance for adjusting the saw-carriage 76 (Fig. 4), while the short bar 68 at left front provides clearance for travel of the tool-slide 98. The left-hand rod 63 derives firm anchorage from the long bar 113 at its rear end, while the right-hand rod 63 derives firm anchorage from the long bar 67 at its front end.

To prepare a last-block 45 for turning, the operator will first examine a selected model 59 and adjust the saw-carriage 76 according to the length of the model plus allowances for stubs required by a block while mounted in a lathe. These factors may be included in the readings on the scale strip 88 (Fig. 3). The saw 12 will thus be located at the desired distance from the saw 13 in consequence of operating the handwheel 84, after which the saw-carriage may be fastened by releasing the screw 86 (Fig. 6a). A filler 51 (Fig. 7) of a height corresponding nearly, if not exactly, to the heel-height of the model may be placed on the heel end jack 15, after which the model will be placed on the jacks, in the position indicated in Fig. 7. Now, with the feed-carriage located at the spotting station by the latches 64, the model will be supported between the spotting tools 10, 11. At this stage the motor 91 for driving the tool 10 should be switched off, but the motor 97 and both sawmotors 75 and 108 may be in operation.

The operator may now swing the registering pin 106 (Fig. 2a) to its registering position and abut the heel end of the model against it. Preferably, the profile surface at the back of the heel part will have a mark indicating the point at which the turning axis should intersect it. The registering pin 70 for the toe end of the model (Fig. 7a) should now be placed in the tool 10 and advanced nearly to the model by operating the lever 94. If the jacks 14 and 15 are not correctly located, they should be shifted along their supporting rods 23, 23. The high point of the filler 51 should engage the bottom of the model near its heel end, and the forepart jack should be located where its jaws 27 (Fig. 5) will engage the widest part of the model (ball portion). The clamping screw 26 (Fig. 5) should now be tightened. The bottom of the ball portion of the model will now be seated on the yieldable spur-guard 47 without engaging the spurs 46.

Next, the heel part jack should be adjusted heightwise, by rotating the corresponding handwheel 21, to place the axis-indicating mark of the model in contact with the registering pin 106. Then, the other hand-wheel 21 should be rotated, if necessary, to adjust the forepart jack heightwise and thereby locate the tip 73 of the model at the axis level indicated by the edge 72 of the pin 70. To obtain an exact indication of this level the edge 72 should be horizontal. These adjustments will regulate the pitch of the model and all blocks 45 that derive their settings therefrom.

Having completed all necessary lengthwise and heightwise adjustments of the model and the jacks, the operator will sight downwardly from above the model and observe whether the midpoint of the toe end is in the vertical plane of the axis of the pin 70 which may be turned to erect the edge 72. Since the heel part and the ball portion of the model will be centered widthwise by the equalizing action of the two pairs of clamping jaws 27, without regard to the mid-point of the toe end, it will usually be found that the jacksupporting frame 23, 23, 24, 25 (Fig. 3) will require angular adjustment about its vertical pivot 55 to place the mid-point of the toe end in register with the pin 70, particularly if the model is crooked. In that event the operator may shift the mid-point of the toe end to the axis of the pin 70 by turning the hand-wheel 57 (Fig. 3). Accordingly, if the crooked model is a left (solid lines in Fig. 2b) its median line 50a, from heel to ball, will be swung to the left (in the drawing), but if the model were a right (dotted lines) its median line 50b, from heel to ball, would be swung to the right. In this view the pivot 55 is represented by a dot.

In Fig. 5 the dotted line 50c represents the cross-sectional contour of a model in the plane of its highest point, and the dotted line 50d represents the cross-sectional contour in the plane of its widest portion (ball). This view also includes a solid line 45 representing the largest girthwise contour of a block having sufficient width to include the contour 50d and sufficient heightwise dimension to include both contours 50c and 50d. Section lines of the contour 45 are omitted to avoid obscuring the dotted line contours. This view also represents the block-holding means as having been adjusted to the left of their median position in accordance with the requirement of a crooked left model and as otherwise indicated by the broken line 50a in Fig. 2b. The line 50a corresponds to the longitudinal median plane midway between the front and rear clamping jaws 27.

While the jacks are being adjusted according to the size and style of a model the clamping bar 34 (Fig. 5) need not be used, but may hang from the sleeve 35. When all necessary adjustments have been made the operator will retract the tool 10, remove the pin 70, depress the latch 109, and return the arm 104 (Fig. 2a) to its position of disuse. Before removing the model from the jacks he should observe the reading on the scale 33 (Fig. 5) indicating the width of the ball portion of the model, because the last-block to be selected for sawing and spotting with regard to that model must produce a higher reading to provide at least a turning allowance at zero grade. Other allowances may be made for both girthgrading and length-grading, but since they involve nothing more than additions or subtractions of known quantities this description will proceed with no further reference to them. Also before removing the model from the jacks the operator should place the clamping bar 34 on the highest point of the model and level it by adjusting the nut 38.

After removing the model and the filler 51 (Fig. 7) the operator will place a block 45 on the jacks and again observe the scale 33 on which the ball-width will be indicated by the upper end of the indicator 30. If the block is wide enough at this portion the clamping bar 34 should be used to measure the height of its cone portion with the setting derived from the model. Having selected a block, preferably of the smallest size that will fulfill the width dimension at the ball and the height of the cone portion, the operator may again use the pin 106 (Fig. 4), to indicate whether the heel end of the block is far enough to the left to be trimmed by the saw 13.

In Fig. 2a the lines 45a and 45b represent the largest girthwise contour of a block, the location of line 45a corresponding to the setting for a crooked left last, and that of line 45b corresponding to the setting for a crooked right last. The line 45c represents the contour of the heel end of the block. In practice, the pin 106 would never be placed in alinement with a block, as in this view, but is so drawn to illustrate the position it would occupy when a model is being used to obtain a setting of the block-holding means.

After a block 45 of desired size has been placed in the desired position on the jacks, the clamping bar 34 (Fig. 5) may be laid across it and interlocked with the lug 39. The nut 38 may be turned up to level the bar, and the nut 41 may be turned down to drive one or more spurs 43 into the top of the block, or a blow may be struck on the top of the bar or on the block itself to drive the latter down on the spurs 46 (Fig. 7) and thereby depress the spur-guard 47. The bottom of the block will then be far enough below the axis of the tool 10 to insure the necessary turning allowance.

After the clamping bar 34 has been finally tightened against the top of the block the two latches 64 (Fig. 1) may be lifted to release the feed-carriage, whereupon the two compression springs 69 will displace the feed-carriage toward the rear of the apparatus and out of range of the latches. The operator may now push the feed-carriage to the rear and thereby feed the block past the saws 12 and 13. The end faces of the trimmed block will then lie in planes perpendicular to the axis 9 of the tool 10. Now, the operator may draw the feed-carriage to its spotting station at the front. A slight over-travel to the front will carry the latches 64 beyond their registering positions, but the reaction of the springs 69 will set the latches against the front faces of the bars 67 and 68.

The block, now positioned at the spotting station, is ready to be spotted, and the operator may switch on the current for the motor 91. Then, by means of the levers 94 and 101 he may move the tool-slides 90 and 98 toward each other and thereby feed the spotting tools into the ends of the block. Endwise displacement and skewing of the block will be prevented by the spurs 46 of both jacks, and sidewise rocking of the cone portion will be prevented by the spurs of the clamping bar 34. The guide rod 92 (Fig. 4) may be provided with a pin 115 to arrest the tool-slide 90 and thereby limit the depth to which the tool 10 may penetrate the block. Likewise, the sleeve 105 will arrest the tool-slide 98 to limit the depth to which the tool 11 may penetrate the block.

When both ends of a block have been spotted and both spotting tools retracted the block will be ready to be set up in a lathe, and may be removed from the spotting apparatus. Any number of blocks may be prepared with one setting of the jacks if identical lasts are to be turned from them, provided their ball portions are wide enough and their cone portions high enough. Furthermore, if mates of identical crooked lasts are desired, blocks to be prepared for them will require reversing the obliquity of the jack-supporting frame 23, 23, 24, 25 by turning the handwheel 57 (Fig. 3). The pointer 61 and scale 62 will provide the necessary indications for such reversals.

Having described the invention, what we claim as new and desire to secure by Letters Patent of the United States is:

1. An apparatus for preparing a last-block comprising two tool-slides movable toward and from each other, means for guiding them along straight parallel paths, a tool carried by one of said slides for spotting one end of a rough last-block, another tool carried by the other one of said slides for spotting the other end of the block, one of said tools having an axis parallel with said paths, means for holding a last-block with its ends exposed in the paths of said tools, a support on which said holding means are mounted, a pivot connecting said holding means and said support, the axis of said pivot being normal to the axis first specified, and means for adjusting said holding means angularly about the axis of said pivot.

2. An apparatus for preparing a last-block comprising two tool-slides movable toward and from each other, means for guiding them along straight parallel paths, a cutting tool carried by one of said slides for spotting one end of a rough last-block, an annular tool carried by the other one of said slides for spotting the other end of the block, the axis of said annular tool being parallel with said paths, means for holding a last-block with its ends exposed between said tools, a support on which said holding means are mounted, a pivot connecting said holding means and said support, the axis of said pivot being normal to that of said annular tool and contiguous to the field of operation of said cutting tool, and means for adjusting said holding means angularly about the axis of said pivot.

3. An apparatus for preparing a last-block comprising two tool-slides movable toward and from each other, means for guiding them along straight aparallel paths, a tool mounted on one of said slides for spotting one end of a rough last-block, a tool mounted on the other one of said slides for spotting the other end of the block, means for supporting a block between said tools, means carried by said supporting means for clamping the block, and means for adjusting said supporting means angularly about a vertical axis normal to a line intersecting both of said tools and at a point in said line contiguous to the operating field of one of said tools.

4. An apparatus for preparing a last-block comprising two tool-slides movable toward and from each other and provided with tools arranged to spot the ends, respectively, of a last-block located between them, two relatively adjustable supporting members between said tool-slides, one for the forepart and the other for the heel part of a last-model or a last-block, as the case may be, a pair of clamping jaws carried by one of said supporting members, a pair of clamping jaws carried by the other one of said supporting members, said jaws being arranged to engage the sides of a model or a block, means for equalizing the clamping movements of each of said jaws and its mate, a holder by which said supporting members are maintained in a cooperative relation to each other, and means for adjusting said holder angularly about a vertical axis.

5. An apparatus for preparing a last-block comprising two tool-slides movable toward and from each other and provided with tools arranged to spot the ends, respectively, of a last-block located between them, a jack for supporting the forepart of a block at a variable level, a jack for supporting the heel part of the block at a variable level, said jacks being individually adjustable heightwise to regulate the pitch and height of the block, adjustable equalizing means carried by each of said jacks for locating the sides of the block equally distant from the median plane of both jacks, means for adjusting the jacks widthwise of the block to locate the ends of the block according to the swing of a right last or a left last, and means for bracing the block against rocking sidewise.

6. An apparatus for preparing a last-block comprising a saw, means for supporting it in a fixed plane, a feed-carriage, means for guiding said carriage along a path parallel with said plane, means on said carriage for holding a last-block rigidly with one end portion thereof in said plane, the carriage being movable to carry the block to and from the saw, said block-holding means including a pivot about which the block is angularly adjustable in a plane normal to said saw plane, the axis of said pivot being perpendicular to the path of the carriage and parallel to the plane of the saw, a tool arranged to spot one end of the block when the latter is retracted from the saw, said tool having an axis perpendicular to said plane, means for guiding the tool along its own axis, and means for registering said carriage at a spotting station at which the axis of said pivot will intersect the axis of said tool.

7. An apparatus comprising two jacks arranged to support the forepart and the heel part, respectively, of a rough last-block, means for spotting the ends of a last-block lying on said jacks, two pairs of jaws arranged to clamp a last-block widthwise, said pairs being carried by said jacks, respectively, and the jaws of each pair having oppositely inclined surfaces converging downwardly by which they may be forced apart in consequence of depressing a last-block between them, and means connecting each of said jaws and its mate to equalize their movements toward and from each other.

8. An apparatus comprising a frame, a feed-carriage provided with adjustable means for holding a last-block rigidly in a selected relation thereto, means for guiding said carriage on said frame, a stationary saw, power means for operating the saw, a spotting tool, said carriage being movable to feed a last-block to the saw and thence to a station in the field of said spotting tool, and cooperative locking means on said carriage and said frame to fasten said carriage in a predetermined position in relation to said tool.

HENRY F. LOEWER.
OSCAR S. PORTER.

REFERENCES CITED

The following references are of record in the file of this patent:

UNITED STATES PATENTS

| Number | Name | Date |
|---|---|---|
| 865,250 | Jaquith | Sept. 3, 1907 |
| 1,050,198 | Allen et al. | Jan. 14, 1913 |
| 1,104,743 | Ballard | July 21, 1914 |
| 1,206,313 | Dunbar | Nov. 28, 1916 |
| 1,316,959 | Keiser | Sept. 23, 1919 |
| 1,460,678 | McNichol | July 3, 1923 |
| 1,576,715 | Boynton | Mar. 16, 1926 |
| 1,977,463 | Van Duyn | Oct. 16, 1934 |
| 2,030,141 | Fitzpatrick | Feb. 11, 1936 |
| 2,214,837 | Madigan | Sept. 17, 1940 |

FOREIGN PATENTS

| Number | Country | Date |
|---|---|---|
| 332,046 | Great Britain | July 17, 1930 |